US011893974B2

(12) United States Patent
Chatterjee

(10) Patent No.: US 11,893,974 B2
(45) Date of Patent: Feb. 6, 2024

(54) FLOW CONTROLLED SOUND GENERATION APPARATUS

(71) Applicant: DeftIO LLC, San Francisco, CA (US)

(72) Inventor: Manjirnath Chatterjee, San Francisco, CA (US)

(73) Assignee: DeftIO LLC, San Francisco, CA (US)

( * ) Notice: Subject to any disclaimer, the term of this patent is extended or adjusted under 35 U.S.C. 154(b) by 0 days.

(21) Appl. No.: 17/687,479

(22) Filed: Mar. 4, 2022

(65) Prior Publication Data

US 2022/0262334 A1 Aug. 18, 2022

Related U.S. Application Data

(63) Continuation of application No. 16/888,331, filed on May 29, 2020, now Pat. No. 11,282,488, which is a continuation of application No. 15/812,050, filed on Nov. 14, 2017, now Pat. No. 10,679,597, which is a continuation of application No. 14/145,783, filed on Dec. 31, 2013, now Pat. No. 9,818,391.

(60) Provisional application No. 61/748,050, filed on Dec. 31, 2012.

(51) Int. Cl.
*G10K 7/00* (2006.01)
*G10K 9/20* (2006.01)

(52) U.S. Cl.
CPC ............... *G10K 7/00* (2013.01); *G10K 7/005* (2013.01); *G10K 9/20* (2013.01)

(58) Field of Classification Search
CPC .. G10K 9/02; G10K 9/08; G10K 9/18; G10K 9/20; G10K 11/22
See application file for complete search history.

(56) References Cited

U.S. PATENT DOCUMENTS

| | | | | |
|---|---|---|---|---|
| 9,818,391 | B2 * | 11/2017 | Chatterjee | G10K 9/20 |
| 10,679,597 | B2 * | 6/2020 | Chatterjee | G10K 7/005 |
| 11,282,488 | B2 * | 3/2022 | Chatterjee | G10K 7/005 |
| 2006/0159568 | A1 | 7/2006 | Lutz | |
| 2006/0182300 | A1 | 8/2006 | Schwartz | |
| 2008/0194984 | A1 | 8/2008 | Keefe | |
| 2012/0082335 | A1 | 4/2012 | Duisters et al. | |
| 2014/0064036 | A1 * | 3/2014 | Tseng | G10K 7/00 367/190 |

FOREIGN PATENT DOCUMENTS

| | | |
|---|---|---|
| JP | 2004-147051 A | 5/2004 |

OTHER PUBLICATIONS

Notification Transmittal, International Search Report and Written Opinion dated Mar. 31, 2014, for Application No. PCT/US2013/078544, 9 Pages.

* cited by examiner

*Primary Examiner* — Sunita Joshi
(74) *Attorney, Agent, or Firm* — Mahamedi IP Law LLP

(57) ABSTRACT

A flow controlled sound generation system is disclosed that includes one or more fluid pumps to control air flow through a sound channel. The air flow is modulated through one or more valves to produce audible frequency pressure waves.

12 Claims, 11 Drawing Sheets

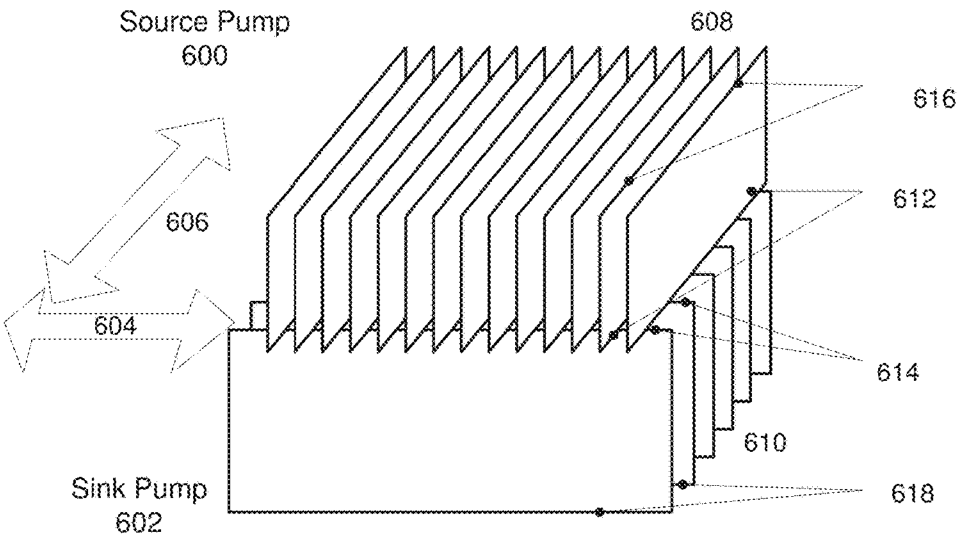
FIG. 6A
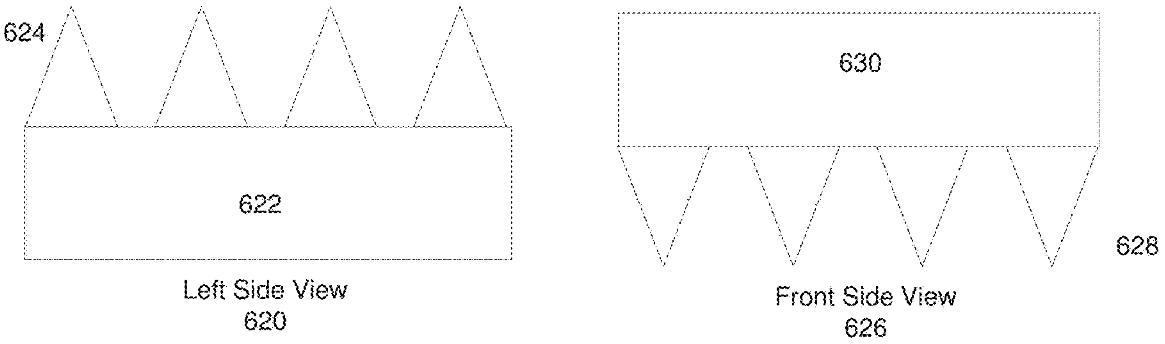
FIG. 6B
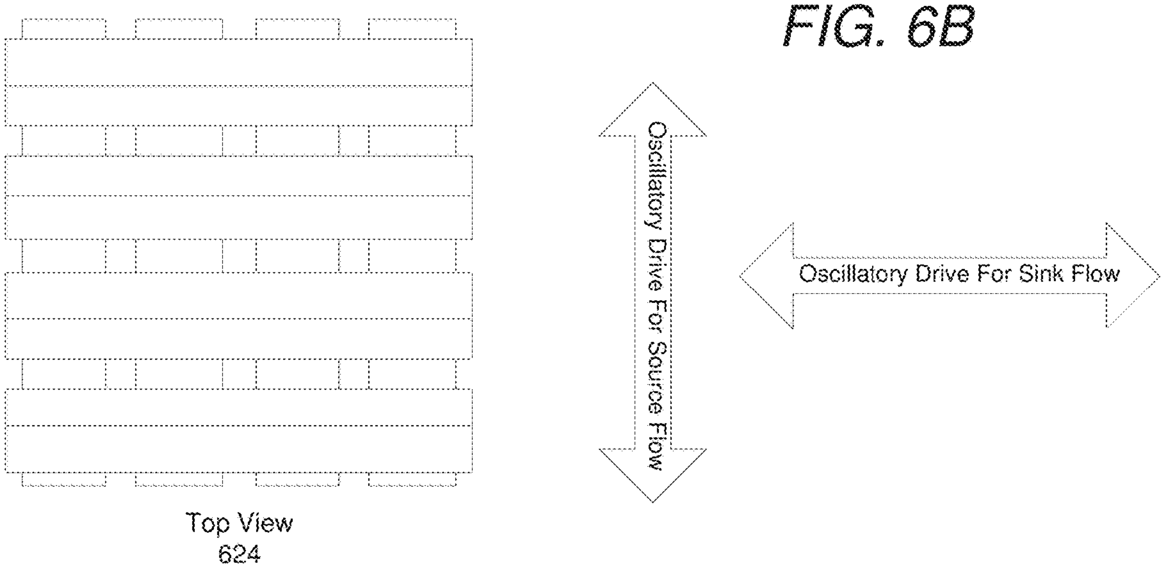

FLOW CONTROLLED SOUND GENERATION APPARATUS

RELATED APPLICATIONS

This application is a continuation of U.S. patent application Ser. No. 16/888,331, filed May 29, 2020, which is a continuation of U.S. patent Ser. No. 15/812,050, filed Nov. 14, 2017, now U.S. Pat. No. 10,679,597, which is a continuation of U.S. application Ser. No. 14/145,783, filed Dec. 31, 2013, now U.S. Pat. No. 9,818,391, which claims the benefit of priority to U.S. Provisional Patent Application Ser. No. 61/748,050 entitled "Flow Controlled Sound Generator," filed Dec. 31, 2012; all of the aforementioned priority applications being hereby incorporated by reference in their respective entirety.

BACKGROUND

Low frequency sound is typically generated using moving diaphragms such as speakers or high voltage electrostatic diaphragms. Audio systems normally utilize a large diaphragm with a sealed frame to generate low frequency pulses.

BRIEF DESCRIPTION OF THE DRAWINGS

The disclosure herein is illustrated by way of example, and not by way of limitation, in the figures of the accompanying drawings and in which like reference numerals refer to similar elements, and in which:

FIGS. 6A and 6B illustrate a bidirectional arrangement for a sheet array included in a fluid pump to produce a bidirectional air flow;

DETAILED DESCRIPTION

Figure 1:
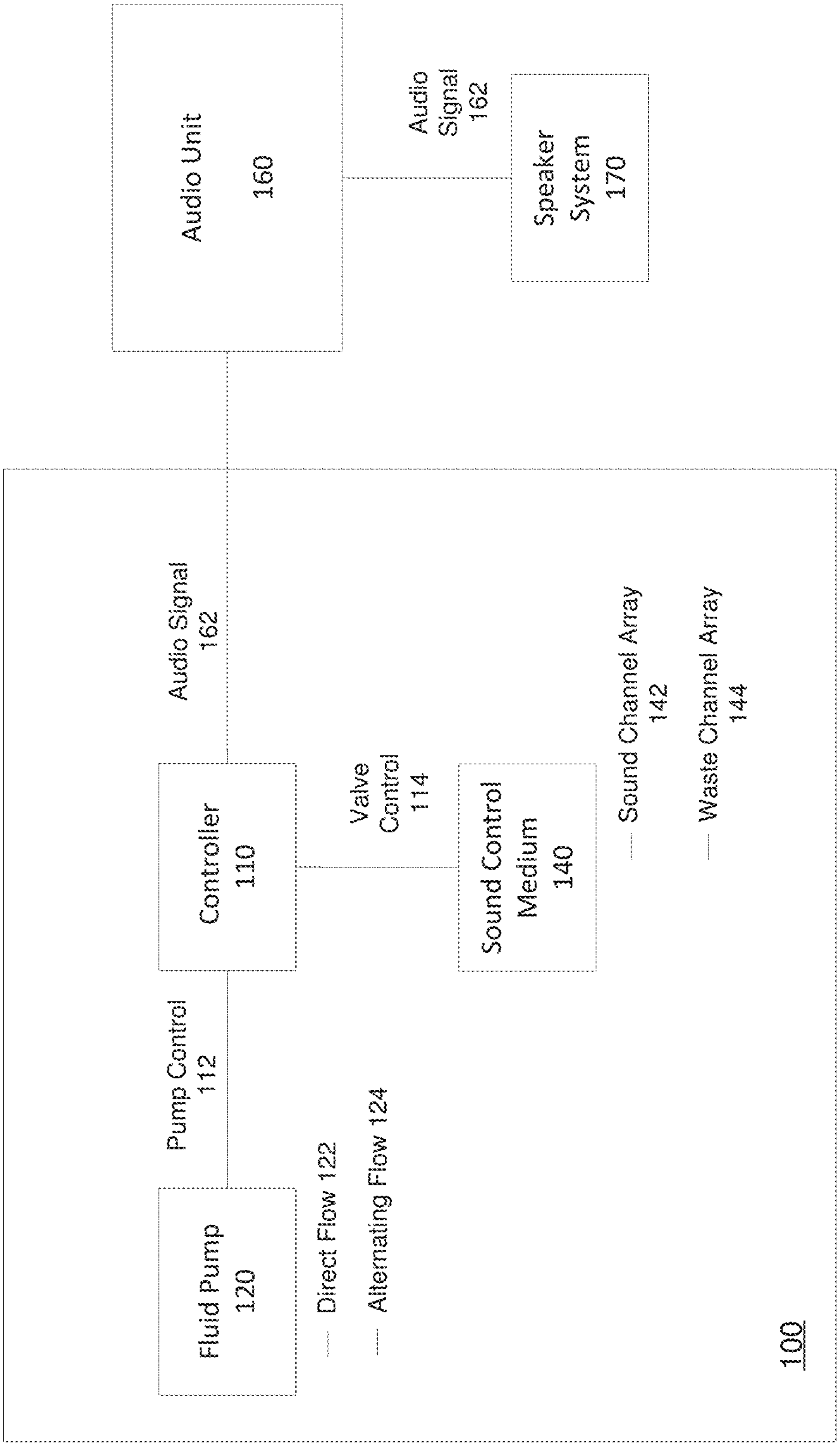
FIG. 1 is an example block diagram of a flow controlled sound generation system.

A sound generation system is disclosed that includes a controller and a fluid pump to produce an air flow through a sound channel. The sound generation system further includes a sound control medium disposed within the sound channel to modulate the air flow to produce pressure waves at a plurality of audible frequencies. Additionally or as an alternative, the fluid pump can modulate the air flow to produce a variety of pressure waves of different phases, frequencies, and/or amplitudes.

In one aspect, the system can be realized as a pump with a post modulator or it can be realized as a dynamic pump which uses high frequency control to modulate its output.

The sound control medium can be an array of micro-valves configured to be operated in unison to produce pressure waves at audible frequencies. For example, low frequency sound waves may be produced at up to 300 Hz or higher. Each micro-valve can be comprised of a single gate, or may include multiple chambers for refined flow modulation. Furthermore, controlled fluid pumps for gas or liquids can provide a high degree of pressure control to the point where audio information can be emitted into a pump fluid medium for use in audio playback applications, actuator applications, or propulsion. Thus, a system is provided to generate controlled modulated acoustic flows for generation of low frequency sound. Also, a modulating pump is provided for fluid flow applications.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein can be implemented, in whole or in part, using computing devices such as desktop computers, cellular or smart phones, personal digital assistants (PDAs), laptop computers, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments can be carried and/or executed. In particular, the numerous machines shown with embodiments include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

FIG. 1 is an example block diagram of a flow controlled sound generation system 100. The sound generation system 100 can be utilized in conjunction with an audio unit 160 and/or a traditional speaker system 170. In variations, an audio signal 162 is generated by the audio unit 160 and outputted to the sound generation system 100. A controller 110 processes the audio signal 162 and implements commands to a fluid pump 120 and/or a sound control medium 140.

The fluid pump 120 can be configured to generate a continuous and direct air flow 122 through a sound channel for modulation by the sound control medium 140. In such variations, the fluid pump 120 can be configured to either pull air into the sound channel, or push air into the sound channel.

Alternatively the fluid pump 120 can be configured to generate an alternating flow 124. For example, the fluid pump 120 can be a slow modulated alternating current (AC) pump such as a circular pump. In such variations, the downstream sound control medium (e.g., a valve array), can be timed to be in phase with the AC pump. Furthermore, for AC implementations, pressurized chambers may be included to bridge periods of low flow times between pump cycles. The AC pump may be a "push-pull" pump, which can redirect airflow as input into the sound channel, or output through the fluid pump 120. Such push-pull pumps can be controlled dynamically according to pump control signals 112 from the controller 110. Still further, the fluid pump 120 can be any variety or combination of different pumps to generate dynamic flows or pulses as described in further detail below.

The fluid pump 120 can be configured to generate either unidirectional or bidirectional airflows, and can further be configured to generate an output flow that can either be modulated or un-modulated. Furthermore, the fluid pump 120 can be ultrasonic and can further be capable of modulating its power in real-time and/or utilize a post modulator, such as a gated apparatus, to achieve a higher degree of pressure control efficacy.

In variations, a second fluid pump operating anti-parallel to the first air pump can be utilized. In such variations, the outputs of both pumps can be merged allowing for true positive and negative pressure amplitudes, and can be achieved through the use of one or more internal valves with varying tradeoff in distortion and/or loading. Certain variations may include a sound channel shaped to allow for flow convergence, and may further include one or more valve arrays to further refine generated pressure pulses.

Furthermore, the fluid pump 120 can include multiple flow channels, where each flow channel can be optimized for an audio frequency band. For example, when a desired sound has a frequency of 125 Hz, air flow may be redirected to a particular flow channel that has been optimized for a frequency range between say 100-150 Hz. In such arrangements, other flow channels can be blocked to allow a single optimized flow for that particular frequency range.

The sound control medium 140 can be disposed within the sound channel and can be coupled to receive the air flow from the fluid pump 120. Furthermore, the sound control medium 140 can be controlled by way of valve control signals 114 from the controller 110. The sound control medium 140 can be a single valve constrictor that "pinches" the airflow according to a desired sound amplitude and/or frequency. However, given that such a constrictor valve can cause distortion and back flow shock to the fluid pump 120, an air regulator may be included to prevent damage to the fluid pump 120. Alternatively, the sound control medium 140 may comprise a single valve redirector that redirects the air flow through one or more waste channels, thereby preventing any back flow that could otherwise damage the fluid pump 120.

In variations, the sound control medium 140 can be an array of valves, or micro-valves (e.g., sound channel array 142) that can be operated in unison to produce pressure pulses to be outputted through the sound channel. In such variations, the sound control medium 140 can be a grating disposed within the sound channel. The grating can have a micro-valve array disposed on a plurality of openings of the grating, where the micro-valves of the micro-valve array can be configured to operate in unison to collectively manipulate the air flow to produce pressure waves at a plurality of audible frequencies.

The sound control medium 140 can also include a waste channel coupled to the sound channel. The waste channel can output a waste flow caused by a collective constriction of the air flow by the micro-valve array. Furthermore, a waste channel grating can be included and disposed within the waste channel, the waste channel grating can also have a micro-valve array (i.e., waste channel array 144) disposed on a plurality of openings of the waste channel grating. Thus, the controller 110 can generate valve control signals that dynamically and synchronously control both the sound channel array 142 and the waste channel array 144 in order to produce the desired sounds.

Figure 2:
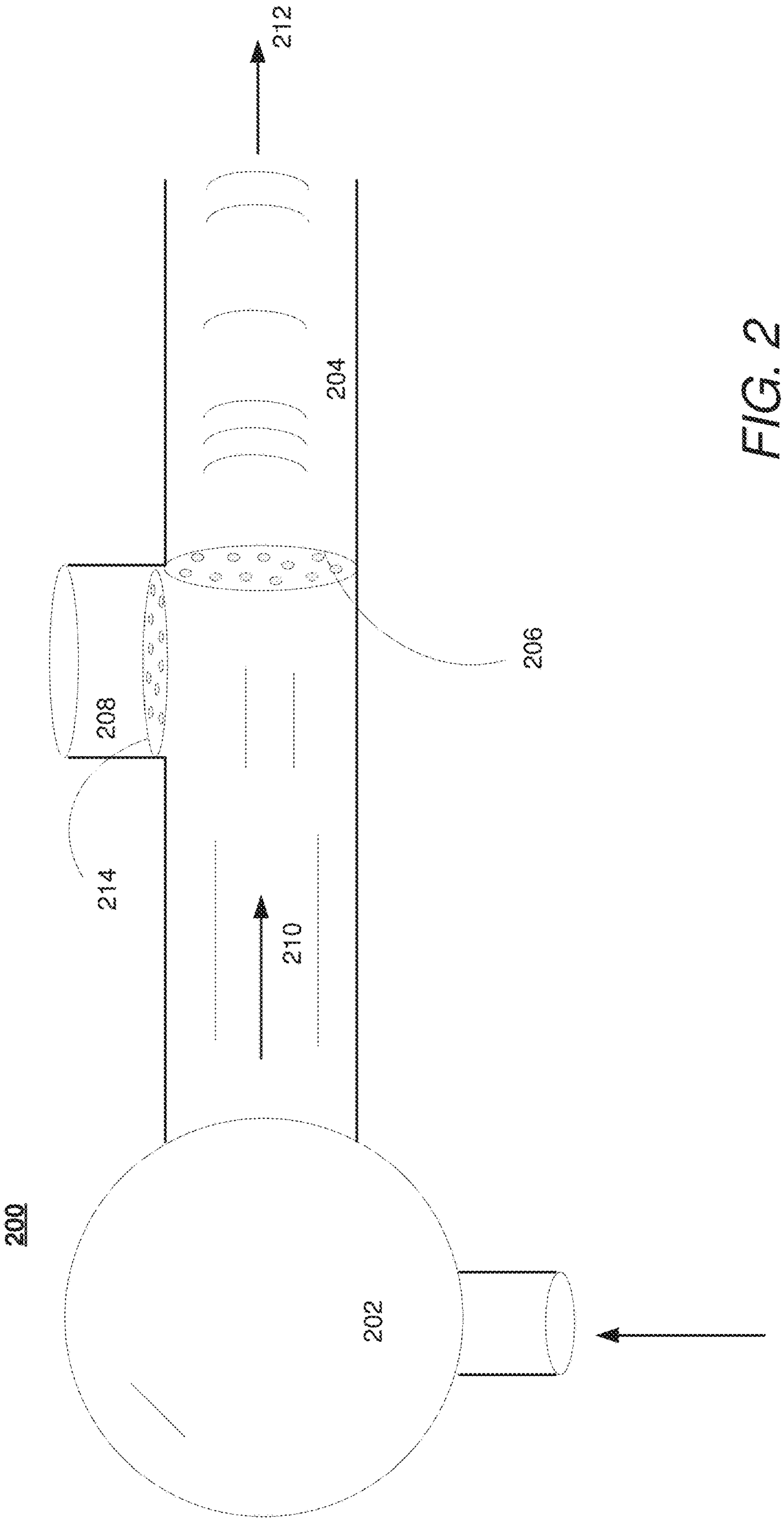
FIG. 2 depicts an example apparatus of a flow controlled sound generation system.

FIG. 2 depicts an example apparatus of a flow controlled sound generation system. In describing elements of FIG. 2, reference may be made elements described with respect to FIG. 1. Referring to FIG. 2, a sound generation system 200 includes a fluid pump 202 to generate an air flow 210 through a sound channel 204. A micro-valve array 206 may be included within the sound channel 204 to modulate the air flow 210 to produce audio pulses 212 of a desired frequency.

A waste channel 208 can be coupled to the sound channel 204 to prevent back flow from damaging the fluid pump 202. Furthermore, as discussed above, a second micro-valve array 214 can be included in the waste channel. Both micro-valve arrays 206, 214 can be synchronized for optimal deliver of sound 212.

Any number of waste channels can be included, as well as any number of optimized sound channels. For example, certain sound/waste channel arrangements may be optimized for a certain frequency range. Such arrangements may include a single sound channel with a plurality of waste channels coupled thereto. Alternatively, multiple sound channels with any number of waste channels may be arranged and tuned to produce optimum audible sounds in a specified frequency range.

The micro-valve arrays 206, 214 can also include any number of valves. As frequency increases, the valves are required to operate more rapidly. Smaller and smaller valves are able to operate more rapidly than larger valves. Thus, gratings may be used to dispose hundreds, thousands, even tens or hundreds of thousands of micro-electro-mechanical (MEM) valves to control the relatively large air flow 210 and produce the sound pulses 212. In order to operate in unison, these MEM valves may be controlled via varying electric fields, magnetic fields, or otherwise.

Furthermore, any number of waste channels 208 and sound channels 204 may be included to produce a wide swath of audio frequencies, from 0 Hz-300 Hz and beyond. For example, a series of sound channels can be coupled to the pump 202 and each can include a micro-valve array, and can be tuned to a certain frequency band. Furthermore, the micro-valves themselves may be tuned or adjusted in size to produce a desired sound quality at a desired frequency band.

As an addition or alternative, the pump 202 itself may include a flow regulator to restrict and admit flow through each of the series of sound channels. Further still, multiple valve array and multiple pump combinations are contemplated that may be tuned to specified frequency bands. Accordingly, a complex system of air flow generation and various degrees of modulation and refinement is contemplated to produce sharp pulses of low frequency pressure waves.

Further still, for AC implementations, some valve types (e.g., piezo) have a limited frequency direct flow response. In other words, such valve types can have difficulty in maintaining constriction. Accordingly, for piezo valves may be coupled in series so that in the aggregate, the correct flow constriction is produced through their combined path. Valve constriction may be intricately controlled to produce audible frequencies of a high quality by means of a precisely timed controller capable of synchronizing the low frequency sound generation apparatus with, for example, an audio unit such as a media player.

Figure 3:
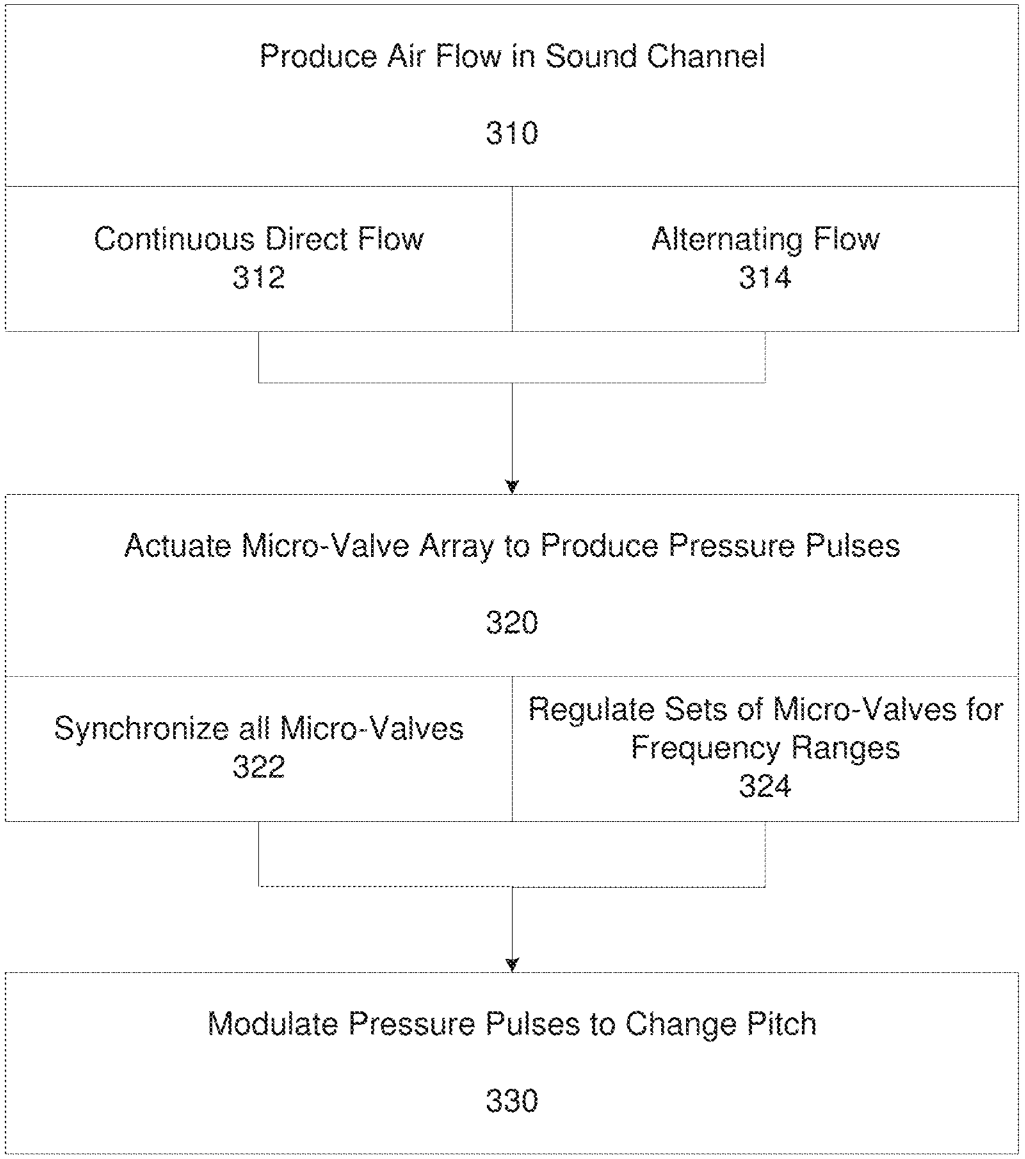
FIG. 3 is a flow chart depicting a method of generating sound by modulating air flow.

FIG. 3 is a flow chart depicting a method of generating sound by modulating air flow. Referring the FIG. 3, the method includes producing air flow in a sound channel (310). As discussed above, the air flow may be generated by any number of fluid pumps (e.g., push, pull, modulated, un-modulated, unidirectional, bidirectional, etc.). The air flow can be a continuous direct flow (312), or an alternating flow (314), and can further be pre-modulated or pulsed to allow for refined post-modulation.

One or more micro-valve arrays may be actuated to produce pressure waves (320) at audible frequencies. For direct flow implementations, the one or more arrays can be configured to simply actuate in order to produce the pulse. However, for slow modulating alternating flows, the one or more arrays may be timed to be in sync according to the alternating flow. Furthermore, all micro-valves can be synchronized to operate in unison (322) in order to produce a desired frequency of pressure wave. Alternatively, certain sets of micro-valves in the array can be regulated, such as closed or shut down during periods when certain frequency bands require (324). For example, a frequency band of 150 Hz-200 Hz may be optimal when a portion of the array is not used to produce a higher quality sound.

As audio signals are transmitted to the controller, the controller can dynamically transmit valve control signals to the one or more arrays in order to modulate the pressure pulses to change pitch (330). Modulation of the pressure waves may also be achieved via the fluid pump. For example, dynamically controllable pumps, such as a non-resonant rigid array pump with an oscillatory drive mechanism, can produce air flow almost instantaneously. Thus, such pumps may be utilized to work in conjunction with the one or more micro-valve arrays in order to produce a higher quality sound and/or more efficient sound production.

Figure 4A:
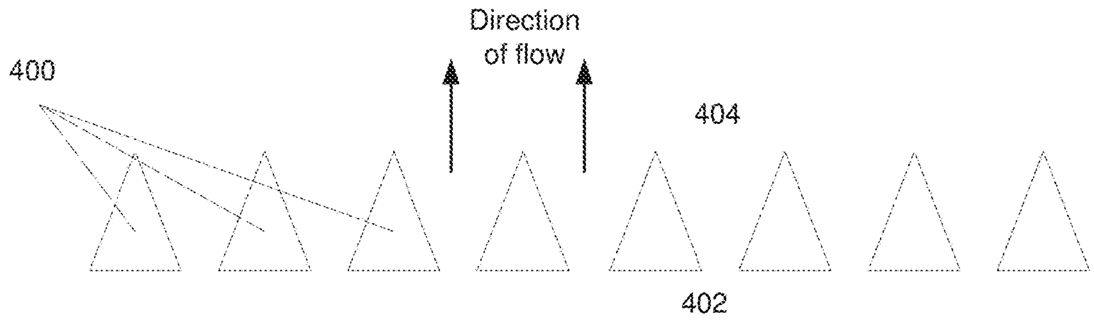
FIG. 4A illustrates an example of a single array of air gates for a fluid pump.

FIG. 4A illustrates an example of a single array of air gates 400 for a fluid pump. Such an array 400 can be driven by a high frequency source which can generate air flow that can be both amplitude and/or frequency modulated to produce pressure pulses. The high frequency source, such as an oscillating driver, can be coupled to an anchored end 402 of the array 400, and the fluid pump can generate a steady air flow by driving the anchored edge 402 of the array 400. As the array 400 is driven, a floating end 404 can produce a steady air flow. By way of both power adjustment and/or chambered valves, the air flow can be modulated to produce pressure waves of varying frequency and amplitude (e.g., at a far lower frequency than the frequency of the high frequency source).

Figure 4B:
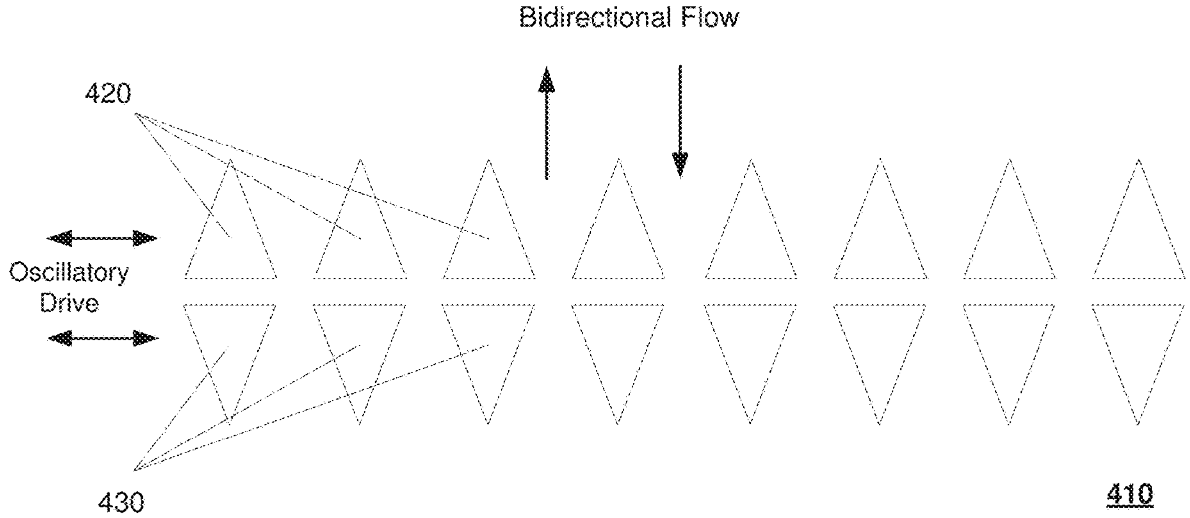
FIG. 4B illustrates an example of an opposing gate array for a bidirectional fluid pump.

FIG. 4B illustrates an opposing gate array 410 for a bidirectional pump. The opposing gate array 410 can include a source array 420 and a sink array 430. Each array can be driven by a high frequency source to produce air flow in either direction or both directions simultaneously. Accordingly, the driven source array 420 may be a source pump, and the driven sink array 430 may be a sink pump. Thus, when a source flow is required, the sink pump can be stopped. Alternatively, when a sink flow is required, the source pump can be stopped. Furthermore, both source and sink pumps may be driven to produce bidirectional airflow that may be channeled and eventually converged for modulation. Initial modulation of the air flow may be performed via constricting valves with multiple phased chambers (described below with respect to FIGS. 8-9). Additionally or as an alternative, the flow may be further modulated where the bidirectional flow converges using a micro-valve array as described above. Such modulation(s) may be tuned to produce high quality low frequency sound.

Flow can be controlled via the high frequency source by: (i) an amplitude of the drive; (ii) a frequency of drive; and/or (iii) a ratio of the source/sink pump drive. However, care should be taken to adjust for interference, and sum and difference of the frequency interactions between source and sink. Furthermore, as is similarly known with a bipolar junction transistor (BJT) amplifier, care must be taken when switching from source to sink and vice-versa. Accordingly, direction of air flow may be bidirectional depending on which of the pumps is operating or which is being driven harder.

Figure 5A:
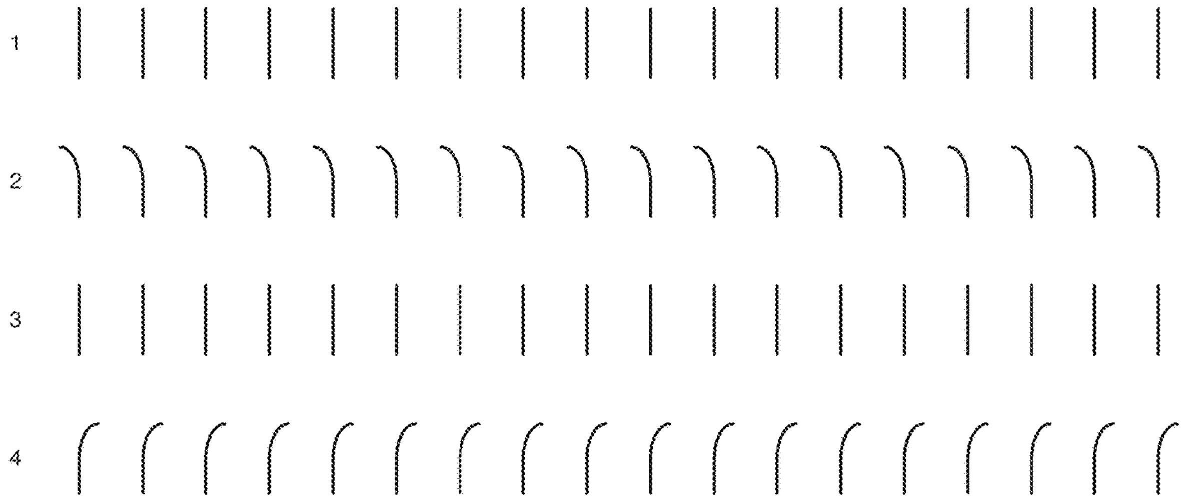
FIGS. 5A and 5B depict examples of sheet arrays included in a fluid pump to produce an air flow.
Figure 5B:
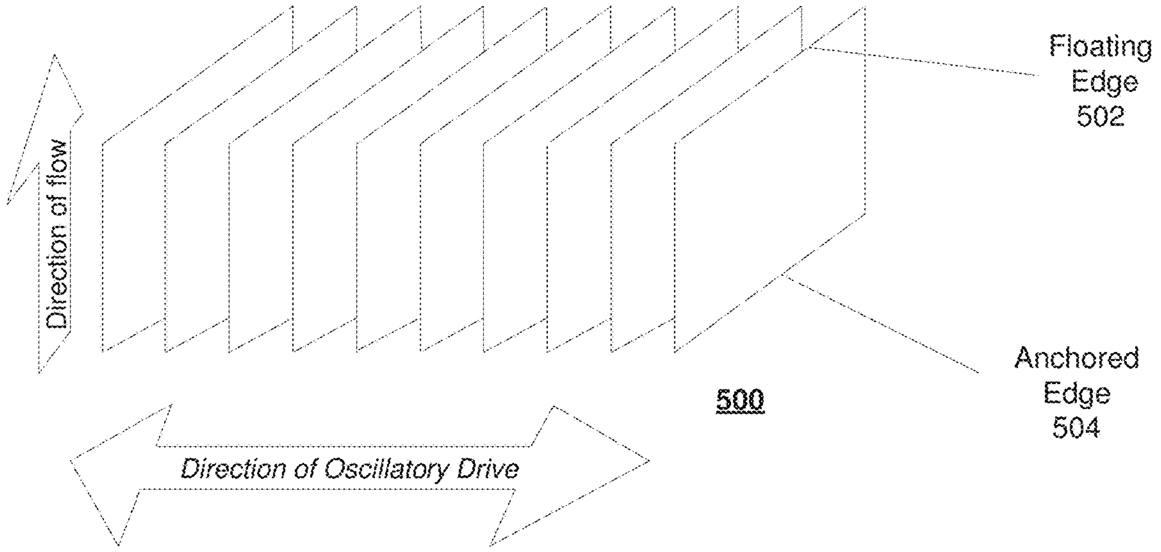

FIGS. 5A and 5B depict examples of sheet arrays included in a fluid pump to produce an air flow. As opposed to the rigid array of FIG. 4, the sheet array 500 has a translated lag at the floating end 502. Referring to FIG. 5A, a timed series (1-4) shows the arrays of sheets, all of which are anchored at one edge 504, over the course of a drive cycle. As shown, an anchored edge 504 is driven by the high frequency source, causing the floating edge 502 to produce air flow, and creating a similar air-grate-pump effect. The amount of bend or translated lag is dependent on material, thickness of each sheet, the length of edges, and a frequency/amplitude of drive signal. Such implementations can be very lightweight. Furthermore, using similar opposing grate-pumps, bidirectional flows can also be created.

FIGS. 6A and 6B illustrate a bidirectional arrangement for a sheet array included in a fluid pump to produce a bidirectional air flow. The arrangement as shown in FIG. 6A includes a source pump 600 and a sink pump 602, each including an oscillatory drive source 604, 606 to drive the arrays in order to produce the bidirectional air flow. For example, drive source 604 is shown as the driving mechanism for the source pump 600, and drive source 606 is the driving mechanism for the sink pump 602. As such, the source pump 600 and the sink pump 602 comprise a bidirectional array including a source sheet array 608 having an anchored end 612 and a floating end 616, and a sink sheet array 610 having an anchored end 614 and a floating end 618. This bidirectional "waffle" arrangement allows for flow in either direction depending on the driving mechanisms, whereby the sink sheet array 610 is orthogonal to the source sheet array 608, and where the anchored ends 612, 614 of the source sheet array 608 and the sink sheet array 610 are tied to each other. By combining both amplitude and frequency modulation of either or both grids of the waffle arrangement the system can produce sounds at any desired audio frequency even with the drive frequencies are in the high ultrasonic range. Although not illustrated to maintain visual clarity, small supporting structures can be attached to the waffle structure to facilitate better conduction from actuators to the waffle blades.

FIG. 6B illustrates perspective views of the bidirectional "waffle" arrangement of FIG. 6A. The "left side view" 620 shows the source pump array 624 anchored to a first sheet 622 of the sink array 610. The drive source 604 for the source pump 600 can oscillate the source pump array 624 at a high frequency to produce a steady airflow in an upward direction. Each sheet in the source array 624 may be tied to a corresponding sheet in the sink array 610. Similarly, the "front side view" 626 shows the sink pump array 628 anchored to a first sheet 630 of the source pump array 624. Also, each sheet in the sink pump array 628 may be tied to a corresponding sheet in the source array 608. Thus, air flow may be produced by driving the sink pump 602 at a high frequency to produce a steady air flow in a downward direction. As discussed above, such flows may be produced simultaneously and converged. Alternatively, periodically alternating flows may be generated and modulated at a single convergence zone in a sound channel.

Figure 7A:
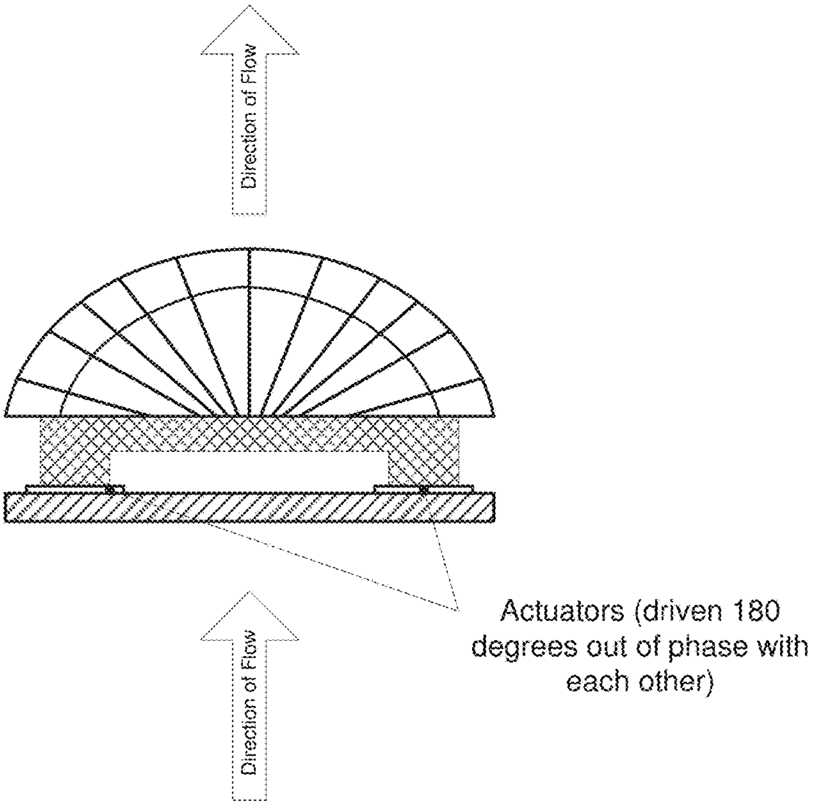
FIG. 7A illustrates a wave grid showing a fan-like structure which is rotationally actuated to cause flow.
Figure 7B:
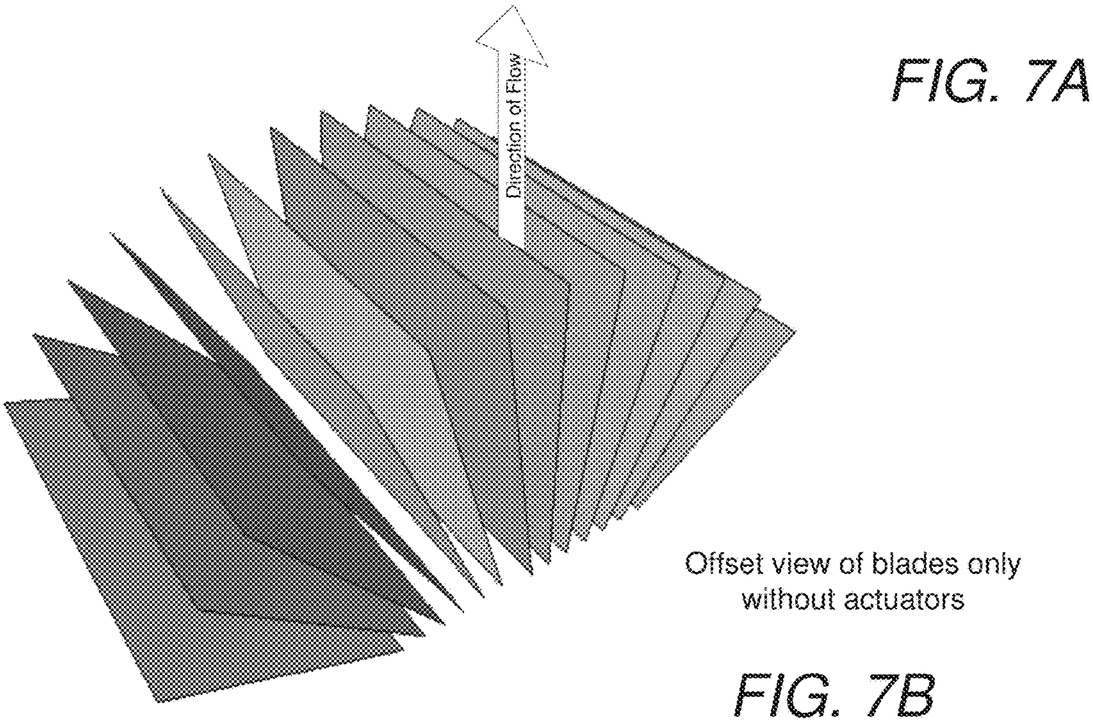
FIG. 7B is a three dimensional view of FIG. 7A with blades rendered for clarity of illustration.

FIG. 7A and FIG. 7B illustrate a wave grid showing a rotational single directional version of the waffle blade topology. FIG. 7B depicts a three-dimensional illustration of the blade in relief for visual clarity with support and actuator structures omitted. Actuators on either side of the fanned out blades cause the blades to move in rotational manner both clockwise and/or counter clockwise about a middle point in center of the actuators. Audio frequencies are achieved via frequency modulation (FM) and amplitude modulation (AM) in combination via the controller in FIG. 1. Supporting structure is shown in FIG. 7A and FIG. 7B to help conduct force from the actuators through the blade assembly.

Figure 8A:
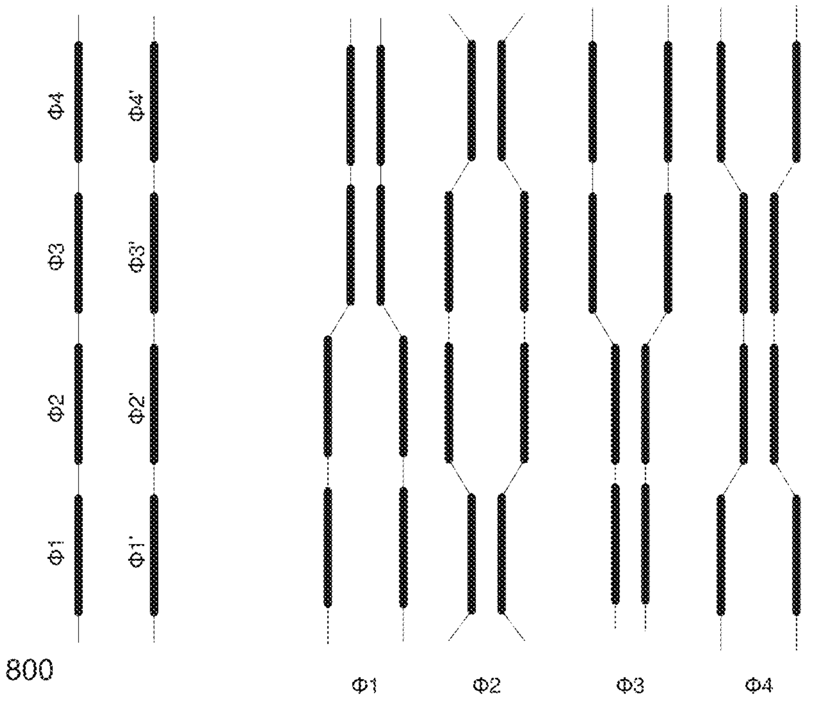
FIGS. 8A and 8B illustrate chamber-based modulators for producing phase-controlled air flow.
Figure 8B:
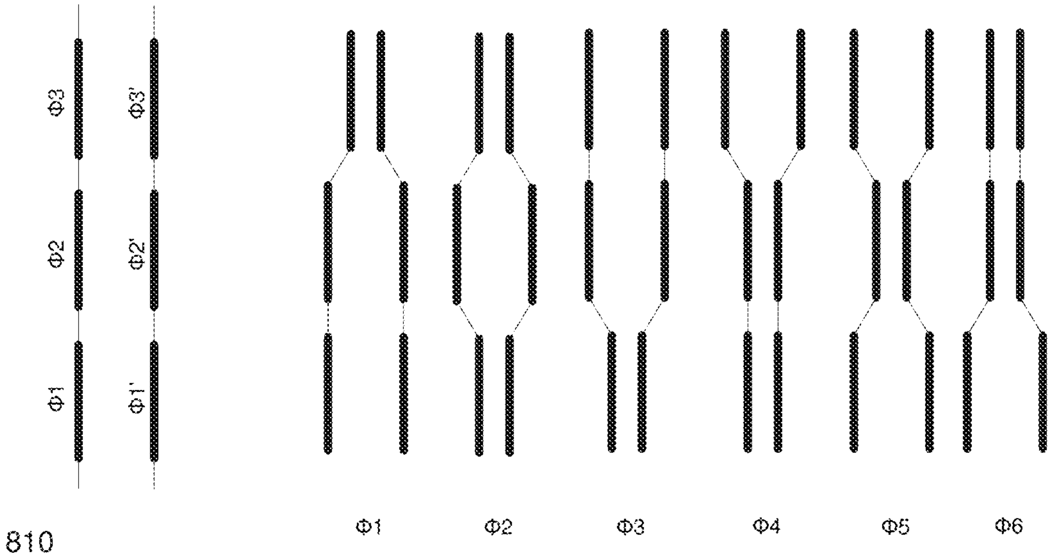

FIGS. 8A and 8B illustrate chamber-based modulators 800, 810 (having four chambers and three chambers respectively) for producing phase-controlled air flow. Referring to FIG. 8A, the chamber-based modulator 800 includes four chambers, and is capable of producing a variety of drive phases. Each chamber in the chamber-based modulator 800 can be driven via an electric field, a magnetic field, mechanically, piezo-electrically, or by way of any combination listed. As shown, the chambers of the modulator 800 can be manipulated (as shown in phases Φ1-Φ4) to modulate airflow being produced by the fluid pump. Such modulation may be performed prior to the flow interacting with the micro-valve array. Alternatively, the micro-valve array itself may be composed entirely of such modulators 800, which may be actuated in conjunction by way of the electric or magnetic field, mechanically, piezo-electrically, or otherwise.

Similarly, FIG. 8B shows a chamber-based modulator 810 that includes three chambers (six drive phases are shown, Φ1-Φ6). The chamber-based modulator 810 can also be driven via an electric field, a magnetic field, mechanically, piezo-electrically, or by way of any combination listed. Similarly still, the modulator 810 is shown as a "constrictor" valve, and can be included with the fluid pump for pre-sound modulation, and/or may comprise the entire micro-valve array as discussed above. Implementations requiring post-modulation to produce audible frequencies can include the micro-valve array, which can be synchronized with the chamber-based modulator 810 in order to produce more precise or refined pressure pulses.

Figure 9:
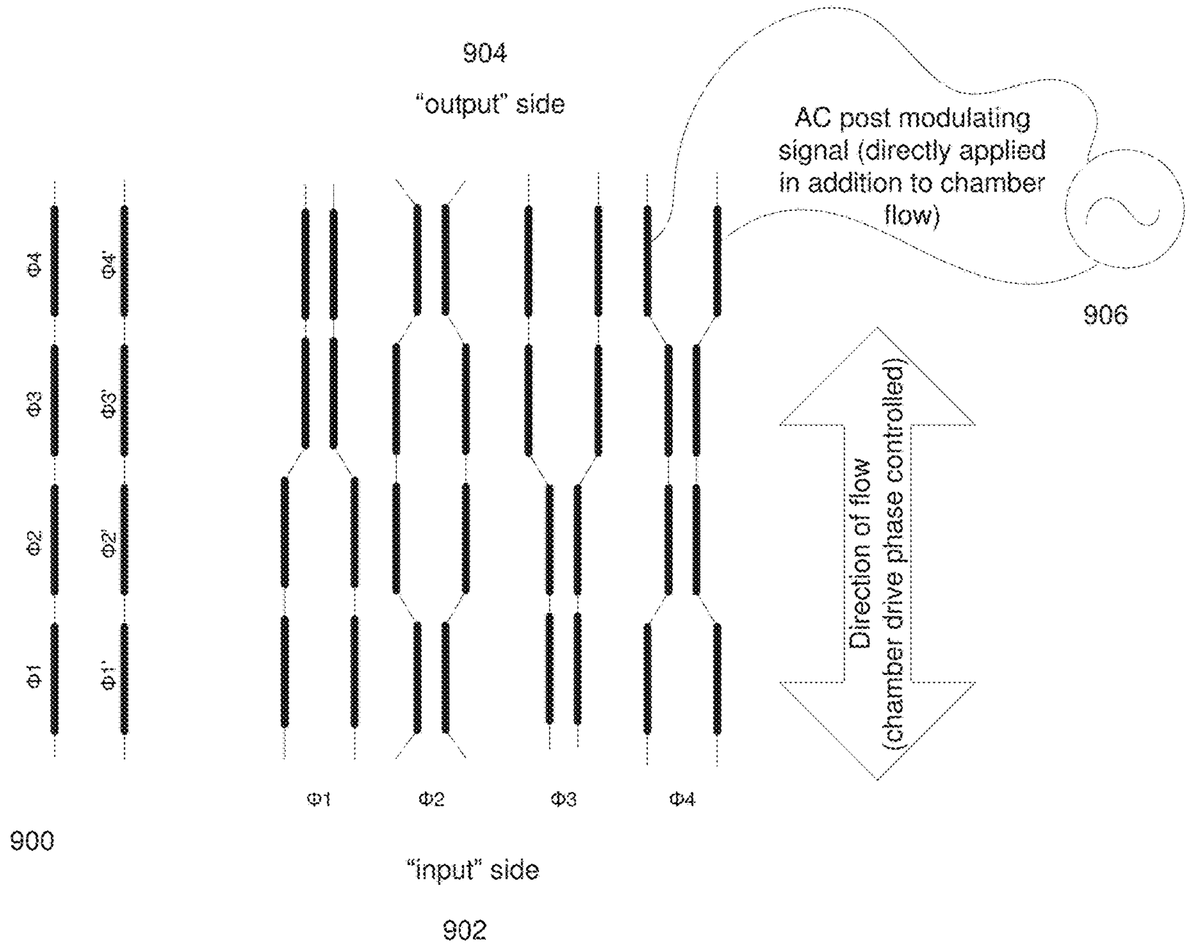
FIG. 9 illustrates an implementation of a chamber-based modulator for producing a phase-controlled air flow.

FIG. 9 illustrates an implementation of a chambered modulator 900 for producing a phase-controlled air flow. Four phases are shown, and include various stages of constriction and release in order to provide a modulated air flow. However, many more phases are possible with a four chambered modulator 900 to produce varying frequency pressure pulses. Phase one (Φ1) shows fluid from a fluid pump entering the modulator through its input side 902 and compressing against the third chamber. A pulse is formed by closing off the modulator and driving the compressed fluid through the modulator as shown in phases two and three (Φ2, Φ3). As shown in phase four (Φ4), the compressed fluid is driven out of output side 904 the modulator 900. For AC implementations, a post modulating signal 906 may be applied in addition to the chambered pulse in order to further refine control of the air flow.

Figure 10:
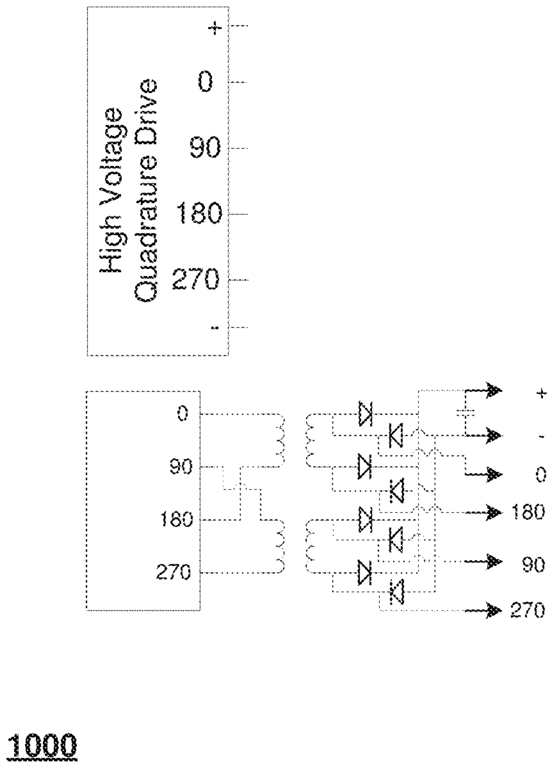
FIG. 10 is an electrical schematic for a four-chambered modulator.

FIG. 10 illustrates an example electrical schematic for a four-chambered modulator. As shown in FIG. 10, a pair of transformers can be configured to trigger the operation of each chamber in the four-chambered modulator as shown in FIG. 9. The circuit 1000 may trigger each chamber according to an applied electric or magnetic field. Additionally or as an alternative, the modulators may be at least partially comprised of piezo-electric material, and may react to pressure, mechanical, and/or electromagnetic signals. Each chamber in the modulator may be triggered accordingly to a different signal, or may be synchronized to another chamber to operate in unison with one or more other chambers in the modulator.

Figure 11:
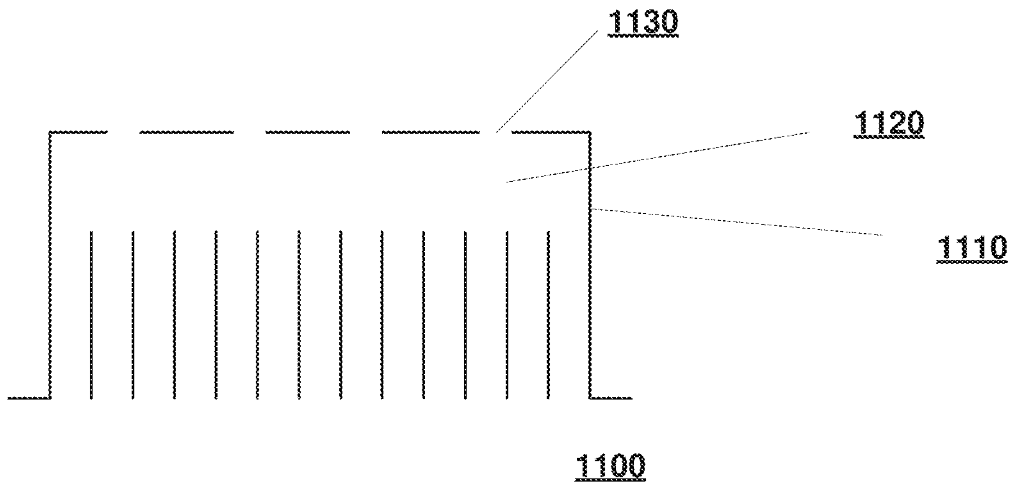
FIG. 11 illustrates an example of a pump apparatus mounted inside a housing.

FIG. 11 illustrates the pump apparatus 1100 mounted inside a housing 1110 with a small chamber 1120 and exit holes 1130. The chamber and exit holes may be tuned to provide a low-pass filter in conjunction with standard acoustic practice to improve frequency response and uniformity for audio quality purposes. For example, each of the exit holes may be tuned for a specified audible frequency.

CONCLUSION

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that this disclosure is not limited to those precise embodiments. As such, many modifications and variations will be apparent to practitioners skilled in this art. Accordingly, it is intended that the scope of this disclosure be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with FIGs below provide examples of processing resources and computer-readable mediums on which instructions for implementing embodiments can be carried and/or executed. In particular, the numerous machines shown with embodiments include processor(s) and various forms of memory for holding data and instructions. Examples of computer-readable mediums include permanent memory storage devices, such as hard drives on personal computers or servers. Other examples of computer storage mediums include portable storage units (such as CD or DVD units), flash memory (such as carried on many cell phones and tablets)), and magnetic memory. Computers, terminals, network enabled devices (e.g., mobile devices such as cell phones) are all examples of machines and devices that utilize processors, memory and instructions stored on computer-readable mediums. Additionally, embodiments may be implemented in the form of computer-programs, or a computer usable carrier medium capable of carrying such a program.

Although illustrative embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

While certain embodiments have been described above, it will be understood that the embodiments described are by way of example only. Accordingly, this disclosure should not be limited based on the described embodiments. Rather, the scope of the disclosure should only be limited in light of the claims that follow when taken in conjunction with the above description and accompanying drawings.

What is claimed is:

1. A sound generation system comprising:

a controller;

a first fluid pump to produce an air flow through a sound channel; and a sound control medium disposed within the sound channel, the sound control medium comprising a valve array, the valve array including a plurality of valves;

wherein each valve of the plurality of valves includes a chamber-based modulator that includes multiple chambers, the chamber-based modulator of each of the plurality of valves being operable to generate multiple drive phases.

2. The sound generation system of claim 1, wherein the controller uses valve control signals to control the sound control medium.

3. The sound generation system of claim 2, wherein the valve control signals correspond to at least one of an amplitude or frequency.

4. The sound generation system of claim 2, wherein the sound control medium includes multiple valve arrays, each valve array including a corresponding plurality of valves.

5. The sound generation system of claim 4, wherein the controller dynamically transmits the valve control signals to the multiple valve arrays.

6. The sound generation system of claim 1, wherein the chamber-based modulator includes four chambers.

7. The sound generation system of claim 1, wherein the valve array and the chamber-based modulator are synchronized.

8. The sound generation system of claim 1, wherein the first fluid pump comprises at least two collinear and opposite phased grates.

9. The sound generation system of claim 8, wherein the controller is operable to control the first fluid pump to produce a push-pull airflow into the sound channel.

10. The sound generation system of claim 1, wherein the first fluid pump dynamically modulates airflow through the sound channel.

11. The sound generation system of claim 1, wherein the first fluid pump comprises a slow modulated alternating pump.

12. The sound generation system of claim 11, wherein the sound control medium is timed to be in phase with the slow modulated alternating pump.

* * * * *